United States Patent
Ochi et al.

(10) Patent No.: US 11,208,535 B2
(45) Date of Patent: Dec. 28, 2021

(54) PRODUCTION METHOD FOR PREPREG, AND PRODUCTION METHOD FOR FIBER-REINFORCED COMPOSITE MATERIAL

(71) Applicant: Toray Industries, Inc., Tokyo (JP)

(72) Inventors: Takashi Ochi, Ehime (JP); Junichi Aoki, Ehime (JP); Takaaki Yamashita, Ehime (JP)

(73) Assignee: TORAY INDUSTRIES, INC., Tokyo (JP)

(*) Notice: Subject to any disclaimer, the term of this patent is extended or adjusted under 35 U.S.C. 154(b) by 203 days.

(21) Appl. No.: 16/494,825

(22) PCT Filed: Feb. 22, 2018

(86) PCT No.: PCT/JP2018/006487
§ 371 (c)(1),
(2) Date: Sep. 17, 2019

(87) PCT Pub. No.: WO2018/173619
PCT Pub. Date: Sep. 27, 2018

(65) Prior Publication Data
US 2020/0277461 A1    Sep. 3, 2020

(30) Foreign Application Priority Data

Mar. 22, 2017  (JP) .............................. JP2017-055614

(51) Int. Cl.
*C08J 5/24* (2006.01)
*B29B 15/10* (2006.01)
*B29C 70/06* (2006.01)

(52) U.S. Cl.
CPC .............. *C08J 5/24* (2013.01); *B29B 15/105* (2013.01); *B29C 70/06* (2013.01); *C08J 2300/00* (2013.01)

(58) Field of Classification Search
CPC ..... B29C 70/06; B29C 70/465; B29C 70/467; B29C 2043/3433; B29B 15/127;
(Continued)

(56) References Cited

U.S. PATENT DOCUMENTS 10,155,344 B2    12/2018  Junker et al.
10,239,970 B2    3/2019   Asano et al.
(Continued)

FOREIGN PATENT DOCUMENTS

JP    01104624 A    4/1989
JP    04296542 A    10/1992
(Continued)

OTHER PUBLICATIONS

International Search Report and Written Opinion for International Application No. PCT/JP2018/006487 dated May 22, 2018. 5 pages.

*Primary Examiner* — Camie S Thompson
(74) *Attorney, Agent, or Firm* — RatnerPrestia

(57) ABSTRACT

The invention enhances the production efficiency in the production of prepreg by allowing the arrangement property and rectilinearity of reinforcing fibers to be well maintained, allowing the basis weight uniformity of an applied resin to be good, and further allowing a high line speed and suppression of contamination in the process to be achieved. The invention provides a method of producing a prepreg, which includes: discharging a molten resin from a discharge portion; introducing the discharged resin by an air flow; and capturing the discharged resin on a reinforcing fiber sheet conveyed continuously, wherein a key point is that the discharged resin is captured in a region in which the reinforcing fiber sheet is conveyed substantially in planar form.

8 Claims, 7 Drawing Sheets

(58) Field of Classification Search
CPC ..... B29B 15/105; B29B 15/122; B29B 11/16;
B32B 2305/076; B32B 2305/08; B32B
5/08; B32B 7/05; B32B 2307/514; B32B
2305/106; C08J 2300/00; C08J 2363/00;
C08J 2363/02; C08J 5/24; H05K 1/0366;
H05K 2201/029; H05K 2203/1545; H05K
2203/1572; B05B 7/00; B05B 7/005;
B05B 7/0075; B05B 7/16; B05B 9/00;
B29K 2101/12
USPC .............................. 264/510; 428/368, 542.8
See application file for complete search history.

(56) References Cited

U.S. PATENT DOCUMENTS

| | | |
|---|---|---|
| 2005/0150593 A1 | 7/2005 | Honma et al. |
| 2009/0309260 A1 | 12/2009 | Keuchel |
| 2012/0100362 A1 | 4/2012 | Ellis et al. |
| 2015/0225518 A1 | 8/2015 | Cinquemani et al. |
| 2016/0303777 A1 | 10/2016 | Miyauchi et al. |
| 2020/0276733 A1* | 9/2020 | Aoki .................. B29B 11/16 |

FOREIGN PATENT DOCUMENTS

| | | |
|---|---|---|
| JP | 11129250 A | 5/1999 |
| JP | 2011127234 A | 6/2011 |
| JP | 2011132389 A | 7/2011 |
| JP | 2011162619 A | 8/2011 |
| JP | 2012529394 A | 11/2012 |
| JP | 2013022868 A | 2/2013 |
| JP | 2013184356 A | 9/2013 |
| JP | 2013203944 A | 10/2013 |
| JP | 2014011850 A | 1/2014 |
| JP | 2014069391 A | 4/2014 |
| JP | 2016203397 A | 12/2016 |
| JP | 2017031517 A | 2/2017 |
| JP | 2017154330 A | 9/2017 |
| WO | 03091015 A1 | 11/2003 |
| WO | 2008098526 A2 | 8/2008 |
| WO | 2009142231 A1 | 11/2009 |
| WO | 2010150022 A1 | 12/2010 |
| WO | 2012013167 A2 | 2/2012 |
| WO | 2015060299 A1 | 4/2015 |
| WO | 2015076981 A1 | 5/2015 |
| WO | 2017068159 A1 | 4/2017 |

* cited by examiner

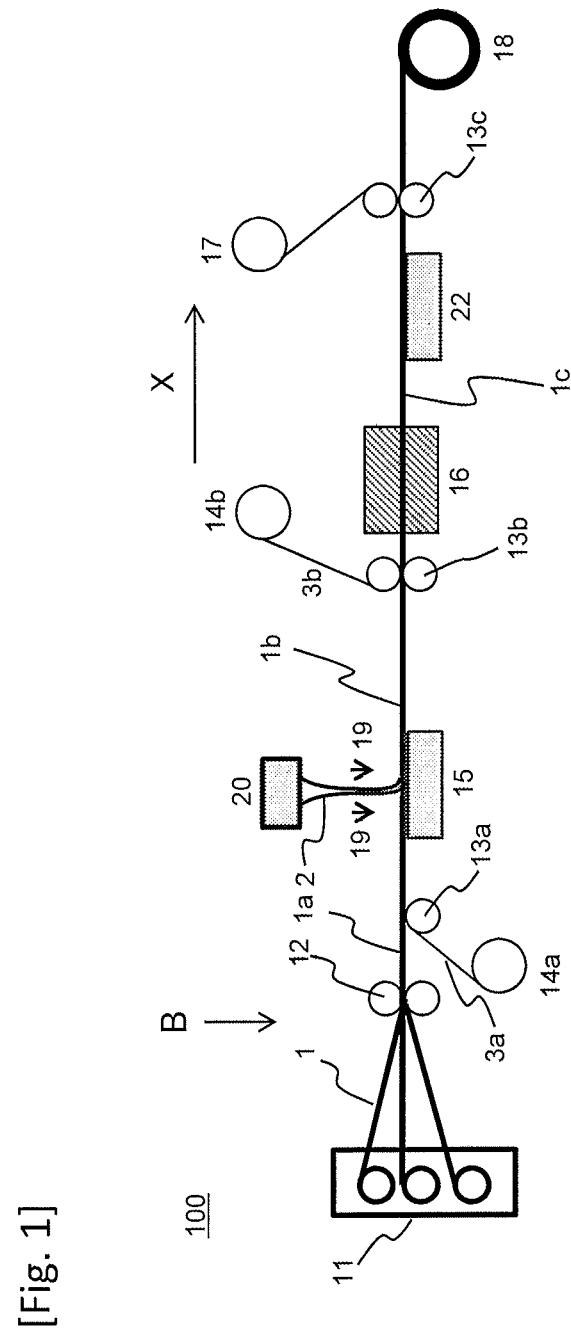

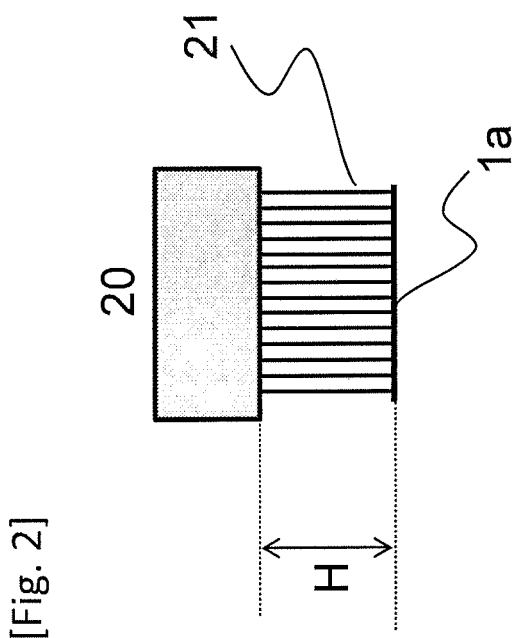
[Fig. 2]

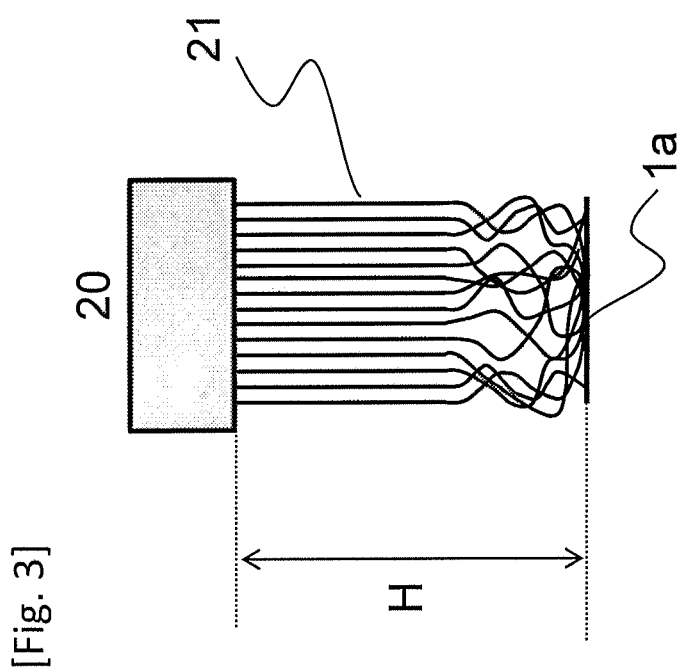
[Fig. 3]

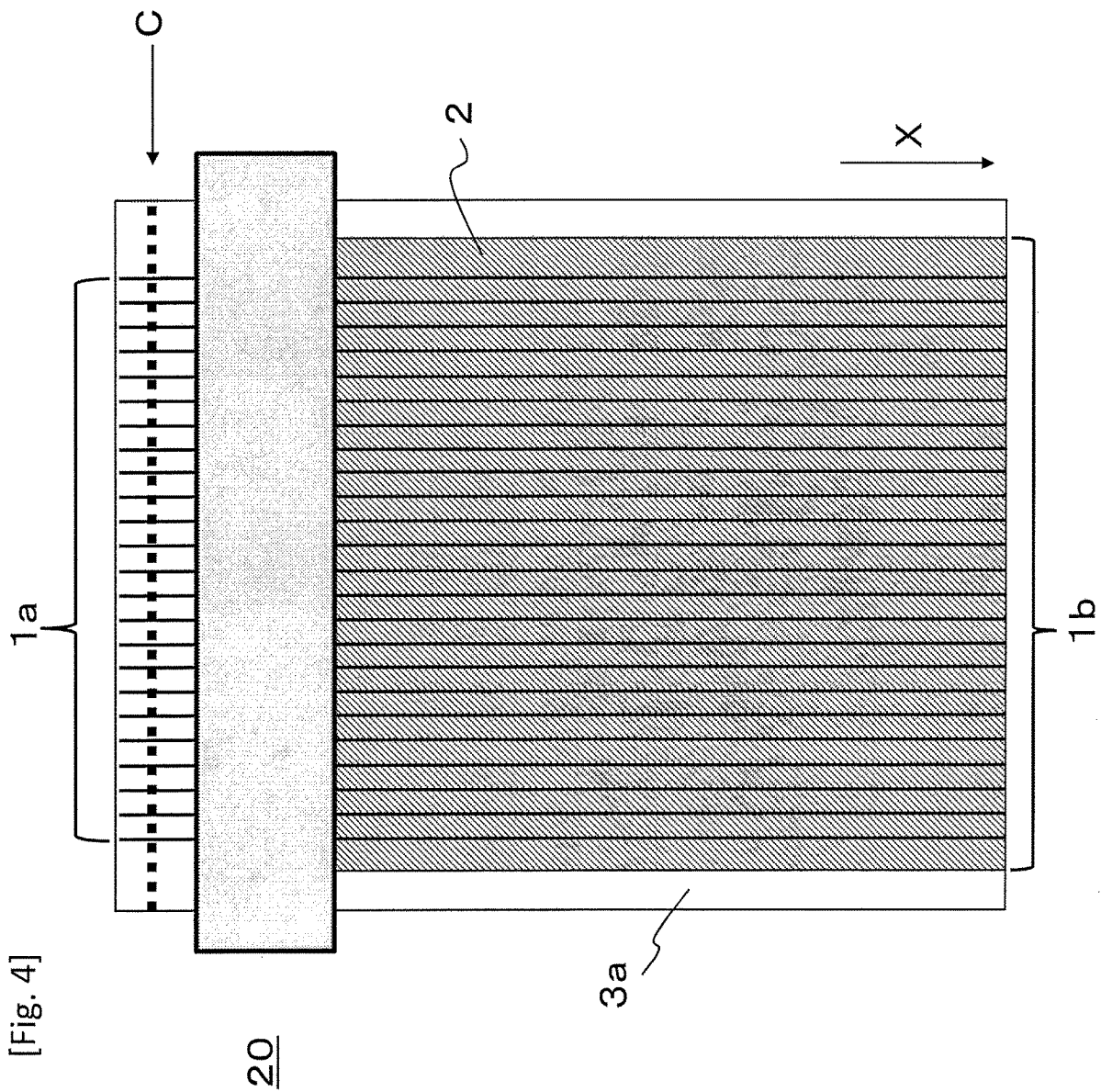
[Fig. 4]

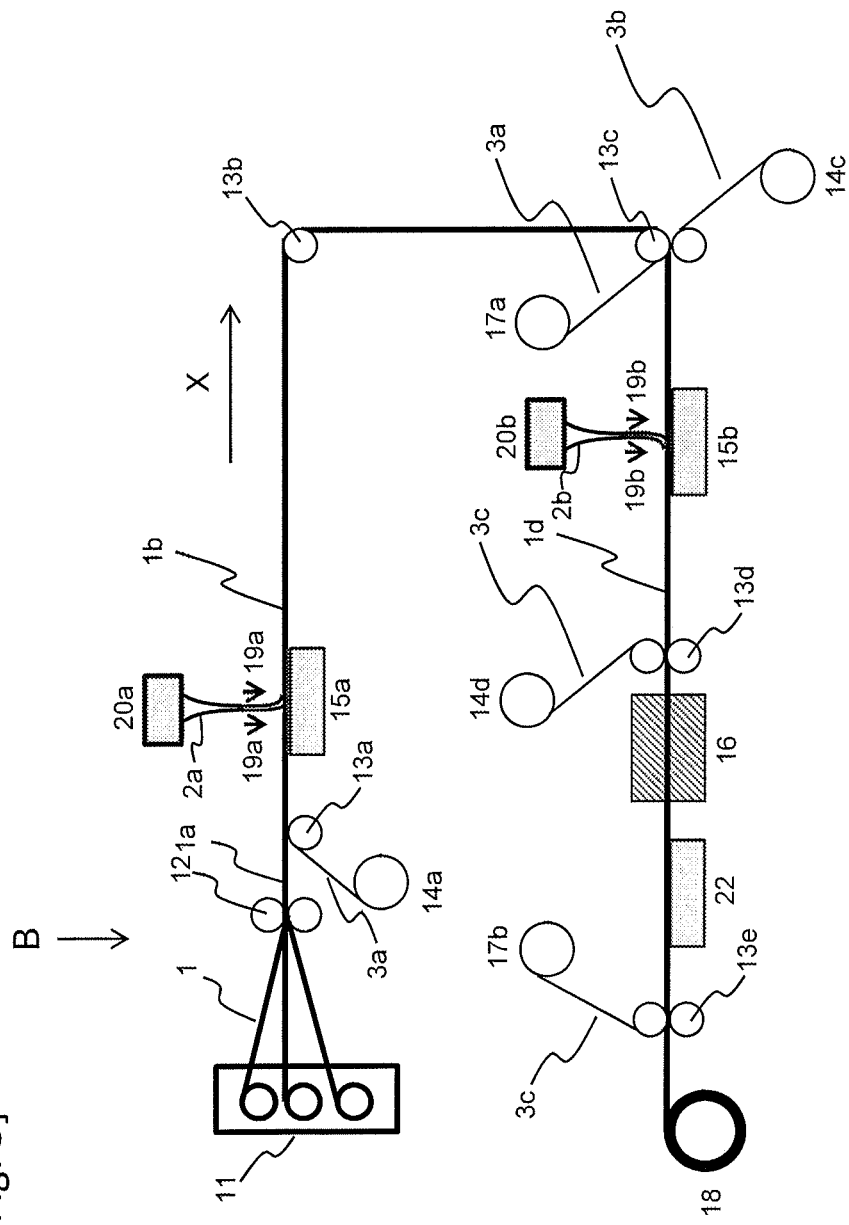
[Fig. 5]

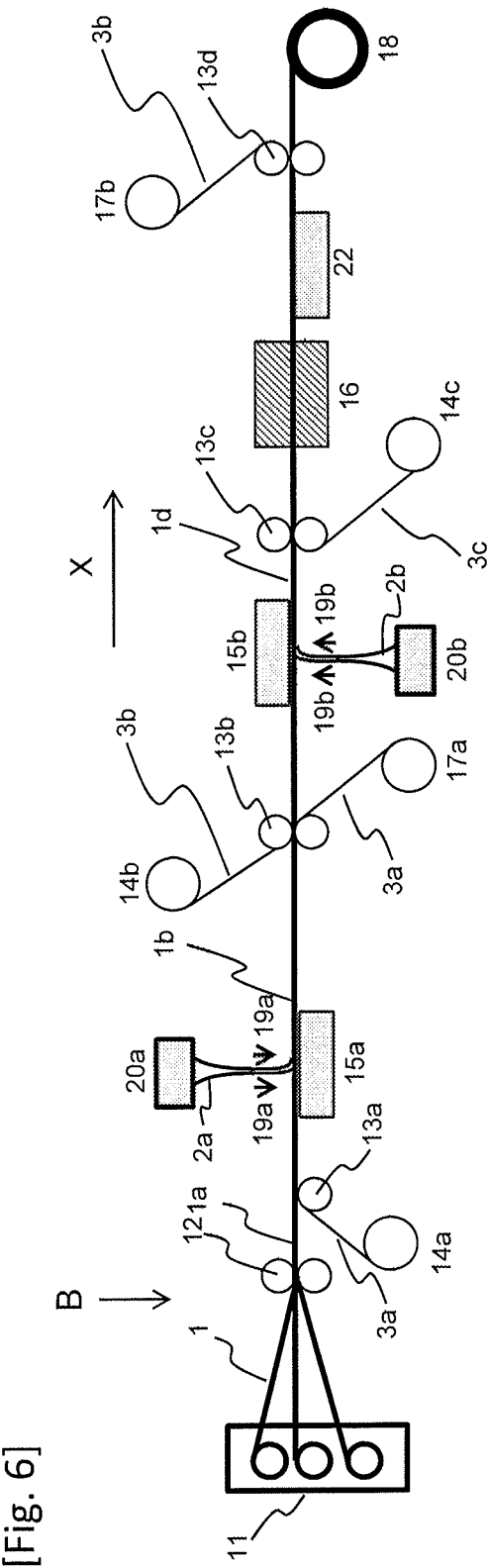
[Fig. 6]

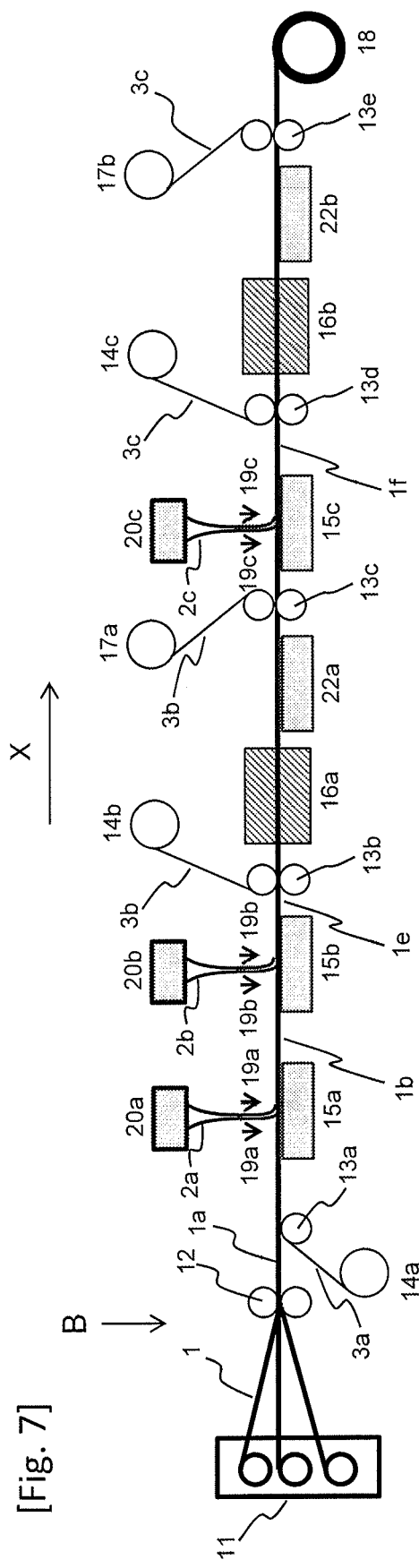
[Fig. 7]

PRODUCTION METHOD FOR PREPREG, AND PRODUCTION METHOD FOR FIBER-REINFORCED COMPOSITE MATERIAL

CROSS REFERENCE TO RELATED APPLICATIONS

This is the U.S. National Phase application of PCT/JP2018/006487, filed Feb. 22, 2018, which claims priority to Japanese Patent Application No. 2017-055614, filed Mar. 22, 2017, the disclosures of each of these applications being incorporated herein by reference in their entirety for all purposes.

FIELD OF THE INVENTION

The present invention relates to an efficient method of producing a prepreg which is a precursor of a fiber reinforced composite material.

BACKGROUND OF THE INVENTION

Fiber reinforced composite materials (FRP) in which a matrix resin containing a thermoplastic resin or a thermosetting resin is reinforced with a reinforcing fiber are used in various fields such as aerospace materials, automobile materials, industrial materials, pressure vessels, construction materials, housings, medical applications, and sports applications. Carbon fiber reinforced materials (CFRP) are widely and suitably used particularly in cases where a high mechanical property and lightness are required. In some of the cases where cost has priority over a mechanical property and lightness, glass fiber reinforced composite materials (GFRP) are used. FRP is obtained as an intermediate base material by impregnating a reinforcing fiber bundle with a matrix resin, the intermediate base material is laminated and molded and in addition, thermally cured if a thermosetting resin is used, and then, members composed of FRP are produced. In the above-mentioned applications, planar objects or objects formed by folding planar objects are often used, and two-dimensional sheet-like objects are more widely used as intermediate base materials of FRP than one-dimensional strands and roving-like objects, from the viewpoint of lamination efficiency and moldability achieved in producing such members.

In addition, an attempt to enhance production efficiency for members composed of FRP has recently promoted the mechanization and automation of lamination of sheet-like intermediate base materials, and here, narrow tape-like intermediate base materials are suitably used. Narrow tape-like intermediate base materials can be obtained by slicing broad sheet-like intermediate base materials into tapes having a desired width or impregnating a narrow reinforcing fiber sheet directly with matrix resins.

As two-dimensional sheet-like intermediate base materials, prepregs obtained by impregnating, with matrix resins, reinforcing fiber sheets formed by arranging the reinforcing fibers into sheet form are widely used. Examples of reinforcing fiber sheets used for prepregs include UD sheets obtained in sheet-like form by arranging reinforcing fibers unidirectionally and woven fabrics obtained by arranging reinforcing fibers multidirectionally. UD sheets are often used particularly in cases where the mechanical property has priority. Differently from this, woven fabrics are used in some of the cases where formativeness has priority.

A hot-melt process that is one of the methods of producing prepregs is a method in which a matrix resin is melted and then applied onto release paper sheets (a resin film forming process), a laminated structure is produced in which a reinforcing fiber sheet is sandwiched between the matrix resin sheets at the upper side and lower side of the sheet, and then, the inside of the reinforcing fiber sheet is impregnated with the matrix resin by heat and pressure. There is a problem in that this method has many steps, cannot increase the production speed, and is costly.

In the industrial fields and the like where higher efficiency rather than a mechanical property is required for FRP, a process in which a reinforcing fiber sheet is directly coated with a resin has been on trial for the purpose of omitting a resin film forming process. In this case, the matrix resin is often a thermoplastic resin in particular. For example, Patent Literature 1 states that a reinforcing fiber sheet is coated directly with a thermoplastic resin using what is called a T-die. In addition, Patent Literature 2 states that what is called a meltblowing method is used to blow a thermoplastic resin to a carbon fiber sheet.

As Example 1 in Patent Literature 3 states that the production speed of prepreg is 5 m/minute, there is a problem in that a conventional production speed of prepreg is slow.

PATENT LITERATURE

Patent Literature 1: JP2013-184356A
Patent Literature 2: WO2003/091015
Patent Literature 3: JP2014-069391A

SUMMARY OF THE INVENTION

From the viewpoint of the quality of FRP, it is important that fuzzing and cleavage caused to reinforcing fibers by abrasion are suppressed in a matrix resin coating step. In order to stabilize the mechanical property and quality of FRP, it is also important that the uniformity of the basis weight of a matrix resin to be applied (the mass of a matrix resin per $m^2$) is good. Furthermore, the arrangement property and rectilinearity of the reinforcing fibers in a prepreg are important particularly in cases where a UD sheet is used.

Further, it is important for higher efficiency that the conveyance speed (line speed) of a reinforcing fiber sheet is made as high as possible, wherein the conveyance speed leads to a production speed of a prepreg.

Patent Literature 1 discloses a method in which a thermoplastic resin is discharged from a T-die and pressed against a reinforcing fiber sheet, but the method poses a problem in that the reinforcing fibers are more likely to cause cleavage and fuzzing and disturb the arrangement property and rectilinearity. In addition, the method causes a pool of the discharged resin to be formed on the reinforcing fiber sheet, as described in FIG. 3 in Patent Literature 1, and accordingly, poses a problem in that the basis weight uniformity is more likely to be worsened.

Patent Literature 2 discloses a method in which resin coating by meltblowing and opening of a carbon fiber bundle by airblowing are carried out simultaneously, and accordingly, the method causes the carbon fiber sheet to be curved downward in a resin coating section, as described in FIG. 4 in Patent Literature 2, and thus causes a problem in that the arrangement property and rectilinearity of the carbon fibers are more likely to decrease. In addition, excessively large airblowing is carried out at the resin coating section, causing the resin to be scattered and thus making it more likely that the device becomes contaminated, and in the fields of industrial production, the number of times of equipment shutdown for cleaning is large, rather causing a problem in that the efficiency and the product quality stability are more likely to decrease. In addition, together with the problems in that the carbon fiber bundle in the resin coating section becomes curved, thus making the distance between carbon fibers ununiform, and in that airblowing is excessively large, the resin coating is more likely to be ununiform, causing a problem in that the basis weight unevenness of the resin is more likely to be large. In Patent Literature 2, it is important that the air permeability of a non-woven fabric is high by virtue of the applied resin, and accordingly, it is conceivable that no attention is paid to the basis weight uniformity of the resin.

That is, a problem addressed by the present invention is to enhance the production efficiency in production of prepreg by allowing the arrangement property and rectilinearity of reinforcing fibers to be well maintained, allowing the basis weight uniformity of an applied resin to be good, and further allowing a high line speed and suppression of contamination in the process to be achieved.

The present inventors have reached the present invention through discovering a prepreg production method for solving the above-mentioned problems in a prepreg production method based on coating a reinforcing fiber sheet directly with a resin.

That is, a method of producing a prepreg according to the present invention is characterized by including: discharging a molten resin from a discharge portion; introducing the discharged resin by an air flow; and capturing the discharged resin on a reinforcing fiber sheet conveyed continuously, wherein the discharged resin is captured in a region in which the reinforcing fiber sheet is conveyed substantially in planar form.

In addition, the method of producing a prepreg is characterized in that the discharged resin is formed into a fibrous form and then captured on the reinforcing fiber sheet.

In addition, the method of producing a fiber reinforced composite material according to the present invention is characterized in that a prepreg obtained by the above-mentioned method of producing a prepreg is then cured.

According to the present invention, the production efficiency in production of prepreg can be enhanced by allowing the arrangement property and rectilinearity of reinforcing fibers to be well maintained, allowing the basis weight uniformity of an applied resin to be good, and further allowing a high line speed and suppression of contamination in the process to be achieved.

BRIEF DESCRIPTION OF THE DRAWINGS

FIG. 1 is a schematic diagram depicting an overview of a production process of a prepreg according to the present invention.

FIG. 2 is a schematic diagram explaining the spinning behavior of the discharged resin in a method of producing a prepreg according to the present invention, wherein the coating height H of the resin is low.

FIG. 3 is a schematic diagram explaining the spinning behavior of the discharged resin in a method of producing a prepreg according to the present invention, wherein the coating height H of the resin is high.

FIG. 4 is a top view of the nozzle and its vicinity, as viewed from above in FIG. 1.

FIG. 5 is a diagram depicting an example of a method of producing a prepreg according to the present invention, wherein both faces of a reinforcing fiber sheet are coated with a resin.

FIG. 6 is a diagram depicting an example of another method of producing a prepreg according to the present invention, wherein both faces of a reinforcing fiber sheet are coated with a resin.

FIG. 7 is a diagram depicting an example of a method of producing a prepreg according to the present invention, wherein a plurality of coating heads are used.

DETAILED DESCRIPTION OF EMBODIMENTS OF THE INVENTION

Preferred embodiments of the present invention will be described with reference to the drawings. In this regard, the following description illustrates one of the embodiments of the present invention, the present invention is not to be construed as limited to the embodiment, and various modifications can be made to the invention to the extent that they do not depart from the object and effect of the present invention.

First, the outline of the method of producing a prepreg according to the present invention will be described with reference to FIG. 1. In FIG. 1, 100 represents one embodiment of a prepreg production process by which a production method according to the present invention can be carried out. Reinforcing fibers 1 are withdrawn from creels 11, and arranged unidirectionally by an arrangement device 12 (arranged in the depth direction of the page in FIG. 1) to form a reinforcing fiber sheet 1a. Then, the reinforcing fiber sheet 1a is conveyed in the direction X by a conveyance roll 13a under a tension such that the reinforcing fibers 1 retain suitable arrangement property and rectilinearity. If necessary, before a coating step, a release sheet 3a is supplied from a release sheet supply device 14a, and inserted onto the lower face of the reinforcing fiber sheet 1a on a conveyance roll 13a. This laminate of the reinforcing fiber sheet 1a and the release sheet 3a is introduced on the upper face of a table 15 in the vicinity of the coating step. Then, a resin 2 discharged from a coating head 20 is introduced onto the table 15 by an air flow 19 to form the reinforcing fiber sheet 1a into a fiber reinforced sheet provided with the resin 2, in other words, a prepreg 1b. Here, the discharged resin 2 accompanies the air flow preferably so as to be stretched out into a fibrous form. Further, if necessary, a release sheet 3b is inserted onto the upper face of the prepreg 1b at conveyance rolls 13b. Then, if necessary, the reinforcing fiber sheet 1a is impregnated with the resin 2 in an impregnation device 16 to form an impregnated prepreg 1c. Then, if necessary, the release sheet 3b is peeled from the upper face at conveyance rolls 13c, and wound up on a release sheet wind-up roll 17. After this, the prepreg is wound up on a winder 18.

Here, the reinforcing fiber can be selected from, for example, high strength and high elastic modulus fibers such as carbon fibers, graphite fibers, organic high elastic modulus fibers (for example, aramide fibers and the like), silicon carbide fibers, alumina fibers, boron fibers, tungsten carbide fibers, glass fibers, and ceramics fibers. As such a reinforcing fiber, only one kind of reinforcing fiber may be used for the same prepreg, or different kinds of reinforcing fibers may be used as a regular or irregular arrangement. Among others, it is preferable to use carbon fiber (CF), from the viewpoint of the mechanical property and weight saving of FRP.

Obviously, the reinforcing fiber sheet may be in woven fabric form or non-woven fabric form, as below-mentioned, and does not necessarily have to be a plurality of reinforcing fibers integrated, for example, by intertangling. That is, in the present invention, the resin is discharged and captured on the reinforcing fiber, and the fibers are thereby integrated with the resin therebetween to afford a prepreg, which is accordingly referred to as a fiber reinforced sheet for convenience. FIG. 1 illustrates a UD sheet, which is a plurality of reinforcing fibers arranged unidirectionally in planar form, but woven or non-woven fabrics composed of a reinforcing fiber, paper, and the like can also be selected suitably in accordance with the application of FRP. Here, the fiber reinforced sheet is not limited to any one having a particular thickness or width, and the thickness and the width can suitably be selected in accordance with the purpose or application. In this regard, the fiber reinforced sheet is easy to handle and accordingly preferable when the aspect ratio defined using the width and thickness is 10 or more.

In this regard, even in cases where the single fibers of reinforcing fiber are arranged into one yarn in tape-like form, the yarn corresponds to one form of the reinforcing fiber sheet.

Examples of resins used in the present invention include thermosetting resins, thermoplastic resins, mixtures of a thermosetting resin and a thermoplastic resin, and the like.

Examples of thermosetting resins include epoxy resins, maleimide resins, polyimide resins, resins having an acetylene terminal, resins having a vinyl terminal, resins having an allyl terminal, resins having a nadic acid terminal, and resins having a cyanate ester terminal. These can be used generally in combination with a hardener or a curing catalyst. In addition, these thermosetting resins can suitably be used in mixture.

As thermosetting resins suitable for the present invention, epoxy resins are suitably used in that epoxy resins have excellent heat resistance, chemical resistance, and mechanical property. In particular, amines, phenols, and epoxy resins whose precursor is a compound having a carbon-carbon double bond are preferable. Specific examples include, but are not limited to: epoxy resins whose precursors are amines, such as various isomers of tetraglycidyl diaminodiphenylmethane, triglycidyl-p-aminophenol, triglycidyl-m-aminophenol, and triglycidylaminocresol; epoxy resins whose precursors are phenols, such as bisphenol A epoxy resins, bisphenol F epoxy resins, bisphenol S epoxy resins, phenol novolac epoxy resins, and cresol novolac epoxy resins; epoxy resins whose precursors are compounds having a carbon-carbon double bond, such as alicyclic epoxy resins; and the like. Bromated epoxy resins resulting from bromating these epoxy resins are also used. Epoxy resins whose precursors are aromatic amines typified by tetraglycidyl diaminodiphenylmethane are most suitable for the present invention because the epoxy resins have favorable heat resistance and favorable adhesiveness to reinforcing fibers.

Thermosetting resins are preferably used in combination with hardeners. For example, for epoxy resins, a hardener can be used if the hardener is a compound having an active group capable of reacting with an epoxy group. Preferably, compounds having an amino group, an acid anhydride group, or an azido group are suitable. Specifically, various isomers of dicyandiamide and diaminodiphenyl sulfone are, and amino benzic acid ester types, suitable. According to specific description, dicyandiamide provides excellent storage stability of prepreg, and accordingly, is used by preference. In addition, various isomers of diaminodiphenyl sulfone afford cured objects having favorable heat resistance, and accordingly, are most suitable for the present invention. As amino benzic acid ester types, trimethyleneglycol di-p-aminobenzoate and neopentylglycol di-p-aminobenzoate are used by preference and have lower heat resistance but have excellent tensile strength, compared with diaminodiphenyl sulfone, and accordingly, are used selectively in accordance with the application. Needless to say, a curing catalyst can also be used, if necessary. In addition, a hardener or a curing catalyst and a complexing agent capable of forming a complex can be used together, with a view to enhancing the pot life of a thermosetting resin. A hardener, curing catalyst, and complexing agent such as these can be contained in the resin.

Thermoplastic resins suitable for the present invention are thermoplastic resins having, in the principal chain, a bond selected from a carbon-carbon bond, amide bond, imide bond, ester bond, ether bond, carbonate bond, urethane bond, urea bond, thioether bond, sulfone bond, imidazole bond, and carbonyl bond, and are more preferably a group of thermoplastic resins belonging to engineering plastics such as polyacrylate, polyamide, aramide, polyester, polycarbonate, polyphenylenesulfide (PPS), polybenzimidazole (PBI), polyimide (PI), polyetherimide (PEI), polysulfone (PSU), polyethersulfone (PES), polyetheretherketone (PEEK), polyetherketoneketone (PEKK), polyaryletherketone (PAEK), and polyamideimide (PAI). In particular, PPS, PES, PI, PEI, PSU, PEEK, PEKK, PEAK, and PAI have excellent heat resistance, and accordingly, are most suitable for the present invention. The molecular weights of these thermoplastic resins are not limited to particular ones, and the thermoplastic resins can suitably be selected from the range from what is called oligomers to ultrahigh molecular weight substances. As oligomers, oligomers having, at the terminal or in the molecular chain, a functional group capable of reacting with a thermosetting resin can be used.

In the present invention, a mixture of the above-mentioned thermosetting resin and a thermoplastic resin is also suitably used. A mixture of a thermosetting resin and a thermoplastic resin affords better results than a thermosetting resin used singly. This is because a thermosetting resin and a thermoplastic resin have antinomic characteristics: in other words, a thermosetting resin is generally disadvantageously brittle but can be molded at low pressure in an autoclave, and contrarily, a thermoplastic resin is generally advantageously tough but difficult to mold at low pressure in an autoclave, and accordingly, using these in mixture can effect a balance between properties and moldability. Such a mixture to be used preferably contains a thermosetting resin at more than 50 mass % of the total resin amount, from the viewpoint of the mechanical property of FRP obtained by curing prepreg.

In addition, the resin in the present invention can preferably contain any kind of additive for the purpose of enhancing the characteristics of FRP, process stability, and the like. Examples of such additives include organic particles, inorganic particles, fillers, performance improvers, and the like, and more specific examples include: organic polymer particles for enhancing the toughness and damping performance of the resulting FRP; carbon particles, carbon nanotubes and the like for enhancing the conductivity. In addition, examples include organic substances and polymers for controlling the surface tackiness properties of the prepreg.

The organic polymer particles used in the present invention are preferably insoluble in a matrix resin, and as such organic polymer particles, ones described in, for example, WO2009/142231 can be used. More specifically, polyamides and polyimides can preferably be used. Among them, polyamides are most preferable in that they have excellent toughness and accordingly, can improve the impact resistance significantly. Examples of polyamides that can be suitably used include nylon 12, nylon 11, nylon 6, nylon 66, nylon 6/12 copolymers, a nylon modified to have a semi-IPN (macromolecular interpenetrating network structure) with an epoxy compound described in Example 1 of JP01-104624A (semi-IPN nylon), and the like. As to the shape of this thermoplastic resin particle, the particle may be a spherical particle, a nonspherical particle, or a porous particle, and the spherical shape is particularly preferable in the production method according to the present invention in order not to decrease the resin flow property. In addition, the spherical shape is a preferable aspect in that the spherical shape has no starting point for stress concentration and affords high impact resistance.

Examples of commercially available polyamide particles that can be used include SP-500, SP-10, TR-1, TR-2, 842P-48, 842P-80 (which are all manufactured by Toray Industries, Inc.), "Orgasol (registered trademark)" 10020, 2001UD, 2001EXD, 2002D, 3202D, 3501D, 3502D (which are all manufactured by Arkema K.K.), "Grilamid (registered trademark)" TR90 (manufactured by Emser Werke, Inc.), "TROGAMID (registered trademark)" CX7323, CX9701, CX9704 (manufactured by Degussa AG), and the like. These polyamide particles may be used singly or in combination of two or more kinds thereof.

The present invention allows a reinforcing fiber sheet to be coated directly with a resin and thus, can omit a film forming process, and the present invention can make a production process more efficient, compared a hot-melt process that is a conventional method of producing a prepreg. Here, the resin coating method is important, and the present invention involves noncontact application, in which a molten resin is discharged from a discharge portion, the discharged resin is introduced by an air flow, and the discharged resin is captured on a reinforcing fiber sheet conveyed continuously. Accordingly, the present invention can solve various problems due to the abrasion of the coating head and/or the discharged resin against the reinforcing fiber sheet, compared with a technique in which a coating head is pressed onto the reinforcing fiber sheet, as described in Patent Literature 1. In addition, introducing the resin by an air flow so as to form the resin into a fibrous form enables the resin to be applied with high basis weight uniformity. In addition, the present invention is characterized in that the discharged resin is captured in a region in which the reinforcing fiber sheet is conveyed substantially in planar form, and accordingly, can solve various problems due to such downward curvature of the reinforcing fiber sheet as described in Patent Literature 2. Here, a region in which a reinforcing fiber sheet is conveyed substantially in planar form refers to a region in which the reinforcing fiber sheet is conveyed substantially linearly in the longitudinal direction in the vicinity of the resin capture portion as shown in FIG. 1 without curving in the longitudinal direction in the vicinity of the resin capture portion as in Patent Literature 2. In FIG. 1, this means that the reinforcing fiber sheet conveyed in the vicinity of the resin capture portion looks substantially linear, as viewed in the horizontal arrangement direction of the reinforcing fibers, in other words, in the depth direction from this side (in the direction C shown in FIG. 4). In the present invention, a specific method in which, even with a downward air flow present, the reinforcing fiber sheet is prevented from curving downward in the coating step is not limited to a particular one, and for example, as shown in FIG. 1, it is effective to dispose, under the reinforcing fiber sheet in the coating step, an item (a table 15 illustrated in FIG. 1) capable of supporting the reinforcing fiber sheet. In addition, it is preferable to convey the reinforcing fiber sheet with suitable tension applied thereto, with a view to retaining the arrangement of the reinforcing fibers.

A resin coating step in the present invention can be carried out, for example, by the following procedures. First, a resin is melted, and the molten resin is metered and transferred. For example, a gear-pump can be used to meter the amount of resin and at the same time, to transfer the molten resin to a coating head. For a prepreg, the resin is often solid at room temperature, and accordingly, is liquefied by heating. In addition, in a case where the resin is a viscous liquid at normal temperature, the resin can be heated so as to become less viscous enough to be discharged from a discharge portion and thus, can be used, and such a case is included as a case of melting in the present invention. If necessary, for example, use of a resin or hardener that is cured with active rays makes it possible that the resin or hardener is semi-solidified or solidified after being applied to a reinforcing fiber. Then, the resin is divided into a plurality of flows in the coating head so that the distributivity of the resin can be enhanced. Then, the resin is introduced into the discharge portion and discharged from the discharge portion. In the present invention, the discharge portion refers to a part of a coating head from which a resin is discharged substantially into the air, and the shape of the discharge portion is not limited to a particular one. Examples of the discharge portion include a nozzle having many holes.

In the present invention, the discharged resin is introduced by an air flow, formed into a desirable fibrous form, and then, introduced onto a reinforcing fiber sheet, and this can be achieved, as in what is called a meltblowing method, by applying an air flow to the discharged resin at the nozzle outlet from which the resin is discharged. In addition, the discharged resin may once be formed into a fiber, and then, the fiber may be pulled with an air flow applied thereto. These methods are described, for example, in "Saishin no Boushigijyutsu", compiled by The Society of Fiber Science and Technology, Japan, published by Koubunshikankoukai (1992), pp. 123-127 (a meltblowing method) and pp. 118-123 (a spunbonding method). In addition, a meltblowing method is also described in J. Ind. Eng. Chem., vol 48(8), 1342 (1956). In the present invention, it is preferable for the convenience of the device that, as in a meltblowing method, one to several rows of nozzle holes are arranged in the width direction, and a heated air flow is applied to the vicinity of the position at which the resin is discharged. In this case, it is preferable, from the viewpoint of coating stability, that an air flow is applied in front of and at the back of the row(s) of nozzle holes arranged in the width direction, as shown in FIG. 1. In addition, adjusting the temperature, flow rate, flow velocity, and direction of the air flow makes it possible to control the spinning properties and cooling of the discharged resin. A meltblowing method is usually used for production of short fiber non-woven fabrics of a thermoplastic resin, and in the method, an air flow is applied to a low viscosity resin at a high speed, and the resin discharged from the nozzle holes is blown so as to be formed into short fibers. The fiber diameters of the resin fibers obtained here are 1 μm to several tens of μm, having large dispersion. In the present invention, it is preferable with a view to enhancing the basis weight uniformity of the resin that the dispersion of the fiber diameters is as small as possible, and further, that the resin fibers are not formed into short fibers but formed into continuous fibers, in other words, long fibers. In setting the production conditions in a meltblowing method adopted for usual polyester non-woven fabrics, the resin viscosity is set to an ultralow viscosity, and the air flow velocity of the air accompanying the discharged polymer is set to a high value, in order to obtain microfibers, but in the present invention, the discharge conditions, the air flow velocity of the accompanying air, and the like are adjusted for the purpose of providing a reinforcing fiber sheet with a resin uniformly. From these viewpoints, the resin viscosity at the discharge head is preferably 1 to 60 Pa·s. As the resin viscosity, a value measured at a strain rate of 3.14 $\sec^{-1}$ can be used. The air flow velocity can be determined, observing how the discharged resin is being formed into fibers.

In this regard, whether the discharged resin has been formed into a fibrous form can be judged, for example, by observing a video of the motion of the path (spin-line) of the resin that is being formed into a fibrous form and leading from the coating head to the reinforcing fiber sheet, wherein the video is recorded using a high speed video camera. In cases where the resin is being formed into a continuous fiber, the motion of the resin formed into a fibrous form is observed as if the resin is rocking with the upstream linked with the downstream on the spin-line. In addition, the resin captured on the reinforcing fiber sheet is observed, and if the resin has been formed into a long fiber non-woven fabric form, it is possible to judge that the resin has been formed into a continuous fiber. Also in the case of a short fiber, the resin captured on the reinforcing fiber sheet is observed, and if the resin has been formed into a short fiber non-woven fabric form, it is possible to judge that the resin has been formed into a fibrous form. In the present invention, the captured resin formed into a fibrous form preferably has a fiber length of 1 cm or more, more preferably 10 cm or more, and is still more preferably formed into a continuous fiber. On the other hand, in cases where the resin is scattered in droplets without being formed into a continuous fiber, as above-mentioned, the resin captured on the reinforcing fiber sheet results in a droplet form. In addition, the resin is more unlikely to be observed as if the resin moves with the upstream linked with the downstream on the spin-line, when observed using a high speed video camera as above-mentioned.

In the present invention, the discharged resin formed into a fibrous form and captured on the reinforcing fiber sheet makes it possible to suppress the irregularity of the basis weight of the resin and to make the grade of a prepreg good, and accordingly, is preferable. In addition, there is an advantage in that the surroundings of the device can be less contaminated by the resin. In this regard, it is conceivable that the discharged resin resulting in droplets has a small droplet mass and is accordingly scattered more easily, particularly in cases where the resin results in minute droplets having a droplet size of a few μm to hundreds of μm, and that the discharged resin is more likely to cause contamination because no mechanism that prevents the scatter of droplets is available, differently from the case of a continuous fiber.

In the present invention, the resin is discharged in the resin coating step, and then cooled to have increasing viscosity and stiffness toward the reinforcing fiber sheet. In particular, in cases where the resin is formed into a continuous fiber, the resin with the viscosity and stiffness increased by cooling has the result that the path along which the resin formed into a fibrous form reaches the reinforcing fiber sheet is significantly affected by the air flow. When the height H (which corresponds to the spinning length and hereinafter is referred to as a coating height) from the reinforcing fiber sheet to the lower face (nozzle) of the coating head that is the discharge portion for the resin is low in FIG. 2, the resin formed into a fibrous form reaches the reinforcing fiber sheet with the resin having low viscosity and low stiffness, the reaching path (which corresponds to the spin-line) of the resin formed into a fibrous form is less likely to be affected by the air flow, and accordingly, it is less likely that the resin formed into a fibrous form suffers crossing and confounding in the spin-line or is carried away in the horizontal direction on the reinforcing fiber sheet. Thus, the spin-line becomes linear. Because of this, the resin formed into a fibrous form has a substantially equal distance between the fibers, and the basis weight uniformity of the resin in the width direction is enhanced. Conversely, in cases where the coating height H is high as in FIG. 3, the resin formed into a fibrous form results in having high viscosity and high stiffness before reaching the reinforcing fiber sheet, and accordingly is more likely to be carried away by the air flow, and in some cases, the resin formed into a fibrous form is more likely to suffer crossing and confounding in the spin-line, or be carried away in the horizontal direction on the reinforcing fiber sheet. For this reason, allowing the coating height H to be 1 to 100 mm enhances the basis weight uniformity of the resin, and accordingly, is preferable. It is more preferably 70 mm or less. On the other hand, allowing the coating height H to be 25 mm or more makes it possible to suppress the disturbance of the air flow on the reinforcing fiber sheet, suppress the scatter of resin droplets and fibers, and suppress the contamination by the resin in the vicinity of the coating step, and accordingly, is more preferable.

In addition, allowing the discharged resin to be formed into a fiber, particularly a continuous fiber, makes it possible to suppress the scatter by the air flow and to suppress the contamination by the resin in the vicinity of the coating step, and accordingly, is preferable.

In addition, the better the discharged resin formed into a fibrous form can retain low viscosity and/or low stiffness also downstream in the spin-line, as above-mentioned, the less likely it is that the resin is affected by the air flow. Because of this, it is possible in some cases that the cooling speed of the resin formed into a fibrous form is controlled on the basis of the resin mass and the specific surface area of the fiber so that the resin can be affected by the air flow less easily. Accordingly, the through-put-rate per a hole and discharge area per a hole of the resin can be adjusted. In some cases, allowing the discharged resin to have low viscosity by using a low viscosity resin or making the resin temperature higher can make it less likely that the resin is affected by the air flow. Thermosetting resins have restrictions on the applicable upper limit of the resin temperature, and accordingly, it is also effective to adjust the through-put-rate per a hole and discharge area per a hole as above-mentioned in cases where the resin has high viscosity. Also on the basis of the temperature, flow rate, and flow velocity of the air flow to be applied to the discharged resin, it is possible to adjust the cooling of the resin formed into a fibrous form and the process of making the fineness smaller, and accordingly, these process parameters can suitably be combined. In the case of industrial production devices, the flow velocity and flow rate of the air flow are adjusted on the basis of the pressure of supplied air, in some cases.

FIG. 4 is a top view of the coating head and its vicinity, as viewed in the direction B (in other words, from above) in FIG. 1. The reinforcing fiber sheet 1a (a UD sheet in this case) is depicted as if the reinforcing fibers 1 are arranged with a clearance between the fibers, but, in reality, it is preferable to arrange the reinforcing fibers 1 with no clearance between the fibers, from the viewpoint of the quality of the prepreg and the mechanical property of FRP.

In the present invention, a release sheet can be adhered to the fiber reinforced sheet on which the resin discharged from the coating head has been captured. A release sheet is not limited to a particular one as long as the release sheet has release characteristics sufficient for a coating resin, and has suitable elasticity and stiffness, and, for example, a film coated with a release paper sheet or a release agent can be used.

In the present invention, the conveyance speeds (line speeds) of the reinforcing fiber sheet and the prepreg are preferably higher, with a view to enhancing productivity. However, it is necessary to be careful because a higher conveyance speed can result in requiring investment in facilities for stable conveyance. In this sense, the conveyance speed is preferably 10 m/minute to 100 m/minute.

In addition, it is possible in the present invention to incorporate an impregnating step, if necessary, after the resin coating step, as shown in FIG. 1. That is, an impregnation operation can be carried out after the discharged resin is captured on the reinforcing fiber sheet conveyed continuously. The impregnation allows the resin applied on the reinforcing fiber sheet to permeate through the inside of the reinforcing fiber sheet, and accordingly, results in providing a prepreg having good handleability, and in addition, generation of voids caused in unimpregnated portions can be effectively suppressed when the prepreg is processed into a composite material, in which a decrease in the mechanical property can be suppressed. A prepreg having many unimpregnated portions causes the reinforcing fibers to have insufficient convergence, resulting in having poor handleability in some cases, and accordingly, not only has a poor mechanical property but also is of poor grade in some cases. An impregnation device is not limited to a particular one, and can suitably be selected from known ones in accordance with the purpose. For example, as described in JP2011-132389A and WO2015/060299, impregnation can be promoted by preheating a laminate of a reinforcing fiber sheet and a resin on a hot plate and sufficiently softening the resin on the reinforcing fiber sheet, followed by using a device for pressing with nip rolls which are heated. The hot plate temperature and nip roll surface temperature for preheating, the linear pressure of the nip rolls, and the diameter and number of the nip rolls can suitably be selected so as to achieve a desired degree of impregnation. In addition, it is also possible to use such "S-wrap rolls" as described in WO2010/150022, wherein a prepreg sheet runs in S-shape through the S-wrap rolls. FIG. 1 in WO2010/150022 describes an example in which a prepreg sheet runs in S-shape, but the contact length between the sheet and the roll may be adjusted in U-shape, V-shape, or A-shape as long as impregnation can be carried out. In addition, opposing contact rolls can be added in cases where the impregnation pressure is increased to enhance the degree of impregnation. Furthermore, as described in FIG. 4 in WO2015/076981, it is also possible to attempt to increase the production speed of prepreg by arranging a conveyor belt opposite to "S-wrap rolls" and thereby enhancing impregnation efficiency. In addition, as described in WO2017/068159, JP2016-203397A, and the like, it is also possible to enhance impregnation efficiency by subjecting prepreg to ultrasonication to heat the prepreg rapidly before impregnation. Alternatively, as described in JP2017-154330A, it is also possible to use an impregnation device in which a plurality of "squeeze blades" are vibrated by an ultrasonic generator. Alternatively, as described in JP2013-22868A, it is also possible to fold a prepreg up and carry out impregnation. In this regard, both a material in which a resin is only laminated on a reinforcing fiber sheet and a material in which a reinforcing fiber is impregnated sufficiently with a resin are referred to as a prepreg in the present invention.

FIG. 1 describes the coating head and the impregnation device, one each only, but needless to say, these, two or more each, can be installed in connection. For example, using two coating heads and two impregnation devices makes it possible that what is called a two-stage impregnation is carried out, wherein the second head and the second device allows a resin composition containing a large amount of resin particles to be used for coating and impregnation. In addition, applying a highly reactive component and a stable component separately using a plurality of coating heads enables even a highly reactive component to be applied in a low-reactive state (for example, at a low temperature). In addition, it is possible to separate a component having high melt viscosity and use it for coating (for example, at high temperature and/or over a large area per a hole). Using a plurality of coating heads in this manner enables the coating conditions to have flexibility in the coating step, and accordingly, is preferable. In addition, in cases where a plurality of coating heads are used as shown in FIG. 7, at least the resin discharged from a first coating head is preferably formed into a fibrous form. The resin discharged from a next coating head is preferably formed into a fibrous form, but, in cases where an additive having no stringent requirements for basis weight uniformity is added, the resin does not necessarily need to be formed into a fibrous form. Examples of such an additive include resins, organic substances, and particles for controlling tackiness properties, and other materials.

Furthermore, in the present invention, at least two heads for discharging a resin are used so that the resin can be captured on both faces of the reinforcing fiber sheet, or so that two kinds of resins can be captured on one face of the reinforcing fiber sheet. For a prepreg, it is obviously possible to coat one face with a resin and impregnate the one face with the resin, but coating both faces with a resin and impregnating both the faces with the resin enables the prepreg to be of high grade and suppresses generation of voids. In cases where both faces are coated with a resin, both the faces may be simultaneously coated using a plurality of coating heads disposed at the positions corresponding to each other on the front face side and the back face side, and both the faces may be sequentially coated with a resin by coating the front face with the resin and then coating the back face with the resin. In addition, in cases where the resin is discharged onto both faces of the reinforcing fiber sheet, the resin captured on one face may be a different kind of resin from the resin captured on the other face. Here, being different in the kind of resin means being not identical in the resin composition.

In this regard, in cases where the spin-line is not vertically downward but horizontal or vertically upward, not only an air flow is applied to the resin, but also the resin can be electrically charged to introduce the resin onto the reinforcing fiber sheet along the lines of electric force. For this, an electrostatic coating technology and an electrospinning technology can be used. Technologies in which an air flow and electrospinning are combined are described, for example, in JP2011-127234A, JP2014-11850A (particularly FIG. 5), and JP2017-31517A, and these technologies can suitably be applied.

FIG. 5 shows an example of a process in which both faces are coated with a resin. A plurality of reinforcing fibers 1 are withdrawn from creels 11, and a reinforcing fiber sheet 1a is formed at an arrangement device 12. Then, a release sheet 3a unreeled from a release sheet supply device 14a is inserted onto the lower face of the reinforcing fiber sheet 1a on a conveyance roll 13a. Then, a resin 2a is discharged from a first coating head 20a, and introduced by an air flow to be formed into a fibrous form. This resin is introduced and captured on the upper face of the reinforcing fiber sheet 1a to be formed into a prepreg 1b provided with the resin 2a. Then, this prepreg passes by the conveyance rolls 13b and 13c, so that the upper face and the lower face are inverted. In addition, the release sheet 3a is peeled off at the conveyance rolls 13c, and instead, a release sheet 3b is inserted onto the face of the prepreg 1b provided with the resin 2a, wherein the face was provided with the resin 2a. Then, a resin 2b is discharged from a second coating head 20b, and introduced by an air flow to be formed into a fibrous form. This resin is introduced and captured on a side of the prepreg 1b, wherein the side was not provided with the resin 2a, and thus, a prepreg 1d both faces of which are provided with a resin is formed. Furthermore, at conveyance rolls 13d, a release sheet 3c is inserted onto the prepreg 1d both faces of which are provided with a resin, and the resulting prepreg was subjected to impregnation using an impregnate device 16. Then, the resulting sheet passes through a cooling device 22, the release sheet 3c is peeled off at conveyance rolls 13e, and the resulting sheet can be wound up by a wind-up device 18.

FIG. 6 shows another aspect of a process in which both faces are coated with a resin. In this case, which is different from that of FIG. 5, a reinforcing fiber sheet provided with a resin is conveyed in the horizontal direction without being turned back. Then, the discharged resin 2b formed into a fibrous form is introduced from below onto the lower face of the prepreg 1b provided with the resin 2a, and for this, an air flow may be used, or lines of electric force may be used as above-mentioned. In this case, it is preferable that the resin 2b is electrically charged and in addition, that an electric potential difference is provided between the discharge head 20b side and the table 15b side so that the lines of electric force can converge on the table 15b. In this manner, the electrically charged resin 2b formed into a fibrous form is introduced upward along the lines of electric force, and can be captured at the lower face side of the table 15b and on the lower face of the prepreg provided with the resin 2a. Making it possible that a fiber is moved upward from below along the lines of electric force and thus applied to a base material is described, for example, in FIG. 1 in WO2012/013167 and FIG. 1 in WO2008/098526.

In addition, the process shown in FIG. 7 is an example in which a plurality of coating heads are used, and the use of a plurality of coating heads for one face side enables different resins to be laminated. In this regard, FIG. 7 illustrates a case of three coating heads, but two coating heads or four or more coating heads are also possible. In addition, the number of the impregnation devices is also two in the illustrated example, but it may be one or three or more, and the installation position may suitably be changed in accordance with the purpose.

First, a resin 2a is discharged from a first coating head 20a, this is formed into a fibrous form, and then, the resulting resin is captured on a reinforcing fiber sheet 1a to form a prepreg 1b provided with the resin 2a. Then, a resin 2b is discharged from a second coating head 20b, this is formed into a fibrous form, and then, the resulting resin is captured on the prepreg 1b to form a prepreg 1e provided with the resin 2b. In this case, the composite state of the resin 2a and the resin 2b is not limited to a particular one. The resin 2a and the resin 2b may be laminated, the resin 2a and the resin 2b may be disposed in parallel in the form of stripes and the like, the nozzle hole arrangement of the coating head 20, the air flow application position, and the coating height can suitably be changed in accordance with the purpose, and depending on the case, a desired composite state can be obtained using lines of electric force as above-mentioned. Then, if necessary, a resin 2c can further be applied using a third coating head 20c in the same manner as above-mentioned. In addition, the impregnation device may be disposed after the first coating head 20a, after the second coating head 20b, or after the third coating head 20c. As shown in FIG. 7, the first impregnation device 16a may be disposed after the second coating head 20b, and further, the second impregnation device 16b may be disposed after the third coating head 20c.

Below, an aspect A, which is an example of a specific aspect in which a plurality of coating heads are used, will be described with reference to FIG. 7. For example, 56 yarns of carbon fiber (T800S-24K manufactured by Toray Industries, Inc.) are used as reinforcing fibers 1, these are arranged unidirectionally using an arrangement device 12 to form a carbon fiber sheet 1a having a width of 300 mm, and a release paper sheet 3a is inserted onto the lower face of the carbon fiber sheet 1a at a conveyance roll 13a. Then, a resin 2a is discharged from a first coating head 20a, introduced by an air flow 19a, and formed into a fibrous form, and the resulting resin is captured on the carbon fiber sheet 1a. As the resin 2a, for example, a resin A composed of an epoxy resin (a mixture of an aromatic amine epoxy resin and a bisphenol epoxy resin) containing a hardener (diaminodiphenyl sulfone) and polyethersulfone can be used. The viscosity of this resin A in this example can be approximately 15 Pa·s at 90° C. at 3.14 sec$^{-1}$. In this example, it is possible that the height H of the first coating head 20a is 50 mm, that the temperature is 90° C., the area per a hole of the nozzle is 0.15 mm$^2$, that the through-put-rate per a hole is 1.8 g/minute, and that the number of nozzle holes in the width direction is 220. In this example, the air flow can be supplied at 0.15 MPa. In this manner, the discharged resin 2a can be formed into a continuous fibrous form. Capturing the fibrous resin 2a on the table 15a enables the carbon fiber sheet 1a to be conveyed linearly even with the air flow 19a present. Without using a second coating head 20b, a release paper sheet 3b is then inserted, at conveyance rolls 13b, onto the upper face of a prepreg 1b provided with a resin, and the resulting sheet is allowed to undergo impregnation in a first impregnation device 16a, and is cooled by a first cooling device 22a. Then, the release paper sheet 3b is peeled off at conveyance rolls 13c, a resin 2c is discharged from a third coating head 20c, and introduced by an air flow 19c, and the resin 2c formed into a fibrous form is captured on a prepreg 1e. As the resin 2c in this case, for example, a resin B composed of an epoxy resin (a mixture of an aromatic amine epoxy resin and a bisphenol epoxy resin) containing a hardener (diaminodiphenyl sulfone), polyethersulfone, and microparticles made of a thermoplastic resin can be used. Here, as the microparticle made of a thermoplastic resin, the "particle 3" described in EXAMPLES in JP2011-162619A can be used. The viscosity of this resin B in this example can be approximately 15 Pa·s at 105° C. at 3.14 sec$^{-1}$. In this example, it is possible that the height H of the third coating head 20c is 50 mm, that the temperature is 105° C., that the area per a hole of the nozzle is 0.16 mm$^2$, that the through-put-rate per a hole is 1.2 g/minute, and that the number of nozzle holes in the width direction is 220. In addition, the air flow can be supplied at 0.15 MPa. In this manner, the resin 2c can be formed into a continuous fibrous form. Capturing the fibrous resin 2c on the table 15c enables the prepreg 1e to be conveyed linearly even with the air flow 19c present. Then, a release paper sheet 3c is inserted, at conveyance rolls 13d, onto the upper face of a prepreg 1f, and the resulting sheet is allowed to undergo impregnation in a second impregnation device 16b, cooled by a second cooling device 22b, and is wound up by a wind-up device 18. In this regard, the conveyance speed of the prepreg is set to 20 m/minute. In this manner, a prepreg containing organic microparticles can be produced.

In addition to the above-mentioned example, an aspect B, which is another example of a specific aspect in which a plurality of coating heads are used, will be described with reference to FIG. 7 in the same manner as above-mentioned. In the aspect B, a resin C composed of a mixture of an aromatic amine epoxy resin and polyethersulfone can be used as the resin 2a discharged from the first coating head 20a. In this example, it is desirable that the through-put-rate per a hole is set to 1.4 g/minute, and that the temperature of the coating head is set to 120° C. The viscosity of this resin C in this example can be approximately 7 Pa·s at 120° C. at 3.14 sec$^{-1}$. In addition, a resin D composed of a bisphenol epoxy resin containing a hardener (diaminodiphenyl sulfone) can be used as the resin 2b discharged from the second coating head 20b. In this example, it is preferable that the through-put-rate per a hole is set to 1.6 g/minute, and that the temperature of the coating head 20b is set to 30° C. The viscosity of the resin in this example can be approximately 15 Pa·s at 30° C. at 3.14 sec$^{-1}$. Polyethersulfone has a long molecular chain, which causes intertangling, leading to a high viscosity, and accordingly, requires a high temperature for coating, but in cases where a hardener is used, the hardener is preferably handled at as low a temperature as possible in order to suppress the progress of a curing reaction. For this reason, using a high-viscosity-causing material such as polyethersulfone and a hardener separately as in the present aspect B enables the coating heads to be set to the respective desirable temperatures. Then, in the same manner as in the aspect A, each of the fibrous resins is captured on the carbon fiber sheet 1a to form a prepreg 1e provided with a resin, and a release paper sheet 3b is inserted onto the upper face of the prepreg, which is then allowed to undergo impregnation by a first impregnation device 16a and cooling by a first cooling device 22a. Then, the release paper sheet 3b is peeled off, and the resulting sheet is wound up by a wind-up device 18. Generally, a prepreg whose surface contains a large amount of resin having a high storage elastic modulus has lower tackiness properties. As to a matrix resin for CFRP, a thermoplastic resin such as polyethersulfone has a higher storage elastic modulus than an epoxy resin, and accordingly, a larger amount of the former resin contained in the surface of a prepreg lowers the tackiness properties. A prepreg obtained in the aspect B makes it possible to have a smaller amount of polyethersulfone present in the surface of the prepreg and accordingly, can have higher tackiness properties.

In addition, in an aspect C which is a variation of the aspect B and is an example in which a third coating head 20c is further used, a resin E composed of a bisphenol epoxy resin containing thermoplastic resin microparticles can be used as the resin 2c discharged from the coating head 20c. Here, as the microparticle made of a thermoplastic resin, the "particle 3" described in EXAMPLES in JP2011-162619A can be used. In this example, the surface of the prepreg can be provided with microparticles made of a thermoplastic resin. In addition, urethane particles or polyamide particles can be used (an aspect D) in place of the "particle 3". Alternatively, a mixture of a bisphenol epoxy resin and carbon particles can be used (an aspect E). Alternatively, in place of the carbon particles, inorganic particles such as metal particles and metal oxide/nitride particles can be used (an aspect F).

A prepreg obtained by the method according to the present invention can be formed into CFRP using usual CFRP-making technology and facilities, and makes it possible that, after a prepreg is obtained by the above-mentioned method of producing a prepreg, the prepreg is cured to produce a fiber reinforced composite material. Accordingly, the prepreg has high versatility and compatibility with facilities. For this reason, the prepreg can be suitably used for articles composed of and/or partially containing various CFRPs.

EXAMPLES (Matrix Resin)
As a matrix resin for a prepreg in the present Examples and Comparative Examples, a resin F composed of an epoxy resin (a mixture of an aromatic amine epoxy resin and a bisphenol epoxy resin) containing a hardener (diaminodiphenyl sulfone) and polyethersulfone was used.

(Measurement of Viscosity of Resin)
For the viscosity of the matrix resin, a dynamic viscoelasticity measurement device (ARES, manufactured by TA Instruments, Inc.) was used. Parallel plates having diameter of 40 mm were used for the device, and the resin was set in a 1 mm gap between the plates. Then, a measurement was taken at a measurement frequency of 0.5 Hz (3.14 sec$^{-1}$) at a temperature ramp rate of 1.5° C./minute to obtain a temperature-viscosity curve. The viscosities of the matrix resins used in the present Examples and Comparative Examples are the viscosities read from the temperature-viscosity curve obtained here and read at a temperature set at the coating head.

(Observation of Disturbance of Arrangement of Reinforcing Fibers on Surface of Prepreg)
From the obtained prepreg, approximately the smallest amount of prepreg that satisfied both conditions: at least 1 m in the longitudinal direction and at least 1 m$^2$ or more as the total area of the prepreg was withdrawn, and the surface of the prepreg was checked by visual observation. A sample having no disturbance in the fiber arrangement was rated as ○, and a sample having some disturbance observed in the arrangement was rated as x. For example, a 350 mm wide prepreg was withdrawn 3 m in the longitudinal direction, and the surface was checked by visual observation.

(Evaluation of Degree of Process Contamination)
The degree of process contamination by a matrix resin in the coating step was evaluated. At a base material speed of 10 m/minute or more, the base material was coated with a matrix resin continuously for ten minutes, and after the coating, the prepreg conveyance system including the prepreg conveyance portions and rolls were checked by visual observation to evaluate the degree of contamination. A result showing almost no contamination in the prepreg conveyance system was rated as ○, a result showing partial contamination as Δ, and a result showing outstanding contamination as x.

(Measurement of Width-Directional Basis weight)
A release material (support) such as a polyester film was coated with a matrix resin to obtain a resin-support sheet (resin sheet). Here, the upper side of the resin/support was also covered with a support, if necessary, and the resulting sheet was wound up. The sheet was cut in the width direction (the direction perpendicular to the running direction of the sheet and parallel to the face of the sheet) into strips, each strip being 25 mm in width and 200 mm in the longitudinal direction. The mass of the resin of the resulting strip-shaped sheet peeled from the release paper sheet was metered using an electronic balance down to the third decimal place to determine the mass of the matrix resin. The mass was divided by the area of the strip to obtain the basis weight per 1 $m^2$ of the matrix resin. This operation was carried out to the resin/support sheet from one edge portion to the opposite edge portion, and the average, standard deviation, and coefficient of variation, i.e. CV value, of the basis weight of the obtained matrix resin excluding both the edge portions thereof were determined. This operation was carried out a total of three times at 1 m intervals in the longitudinal direction of the resin-support sheet, the respective coefficients of variation were determined from the respective determined basis weight averages and standard deviations, and the arithmetic mean value of the coefficients was regarded as the coefficient of variation of the resin sheet. For example, from a 350 mm wide resin sheet, 14 strips are obtained, and 12 strips excluding both edge portions are used to determine the value for each strip.

In this regard, the basis weight of a resin component can be measured using, for example, the following method. In cases where a release paper sheet or a release film is used as a support, the applied resin component is scraped from the support using a spatula to isolate the resin component, the mass of which can then be determined. In addition, the basis weight can be determined from the sampled area. Alternatively, in cases where a support having low release characteristics is used, the resin component is dissolved in a solvent so as to be removed, and the mass of the resin component can be determined from a difference between the original mass and the mass of the residual support. In addition, the basis weight can be determined from the sampled area.

Example 1

The process in the present Example is shown in FIG. 1 (however, the impregnation device 16 was not used). Sixty yarns of carbon fiber (T800S-24K, manufactured by Toray Industries, Inc.) were arranged unidirectionally to form a carbon fiber sheet. The carbon fiber sheet had a width of 300 mm. Then, a release paper sheet was inserted onto the lower face of the carbon fiber sheet, the resulting sheet was introduced on a table, and the sheet was conveyed at a speed of 20 m/minute linearly in the coating step viewed straight from the side. Then, using the coating head 20 described in FIG. 1, the carbon fiber sheet was coated with a matrix resin on the table. During this, the coating conditions were as follows. The temperature of the coating head was 85° C., the area per a hole of the nozzle was 0.16 $mm^2$, the throughput-rate per a hole was 1.0 g/minute, and the number of nozzle holes in the width direction was 220. In addition, air was supplied at 0.15 MPa as an air flow, and the coating height H from the carbon fiber sheet to the lower face (nozzle face) of the coating head was 50 mm. In addition, the viscosity of the matrix resin in this case was 10 Pa·s. Furthermore after the coating step, a release paper sheet was inserted also onto the upper face of the prepreg, and the resulting prepreg was wound up.

When coating was carried out continuously for 10 minutes, the carbon fiber sheet was observed straight from the side, found to have neither laxation nor looseness, and recognized as being linearly conveyed. Next, the coating state of the resin was checked by visual observation, and the spinning state was found to be stable. Furthermore, the coating state was observed using a high speed video camera, and the resin was found to have been formed into continuous fibers as in FIG. 2. Furthermore, the fibrous resins were hardly flowing in the horizontal direction, the resin reached linearly from the nozzle to the carbon fiber sheet, and the interval unevenness between the fibrous resins was found to be small. After the coating, the prepreg conveyance system in the vicinity of the coating device was checked for contamination by visual observation, and almost no contamination was found.

Next, a 3 m piece was cut from the produced prepreg in the longitudinal direction, the appearance and grade of a 1 $m^2$ area of the piece were checked by visual observation, and no arrangement disturbance of the carbon fibers was found in the prepreg.

In addition, the basis weight uniformity of the applied resin in the width direction was evaluated, and the coefficient of variation, or CV, was 4.7%, showing excellent basis weight uniformity. In this case, a polyester film was coated with a matrix resin, which was removed using a solvent, and the mass of the resin was determined.

Example 2 and Example 3

Coating with a matrix resin was carried out in the same manner as in Example 1, and the results were evaluated in the same manner as in Example 1, except that the coating head height was changed as in Table 1 and that the coating height H was changed to 70 mm (Example 2) and 100 mm (Example 3).

When the coating was carried out continuously for 10 minutes, the carbon fiber sheet was observed straight from the side, found to have neither laxation nor looseness, and recognized as being linearly conveyed. Next, the coating state was checked by visual observation, and the spinning state was found to be stable. Furthermore, the coating state was observed using a high speed video camera, and in Example 2, the resin fiber was found to have been formed into continuous fibers as in FIG. 2. Furthermore, the fibrous resins were hardly flowing in the horizontal direction, the resin reached linearly from the nozzle to the carbon fiber sheet, and the interval unevenness between the fibrous resins was found to be small. In Example 3, the continuous fibers were slightly snaking immediately above the carbon fiber sheet, but were enabled to be regarded as having reached the carbon fiber sheet substantially in planar form. After the coating, the prepreg conveyance system in the vicinity of the coating device was checked for contamination by visual observation, and almost no contamination was found.

In addition, the prepreg was checked by visual observation, and was found to have no arrangement disturbance in the carbon fibers. In addition, the basis weight uniformity of the applied resin in the width direction was evaluated, and the coefficient of variation, or CV value, was 4.9% (Example 2) and 7.9% (Example 3).

Example 4

Coating with a matrix resin was carried out in the same manner as in Example 1, and the results were evaluated in the same manner as in Example 1, except that the coating head height was changed to 140 mm.

When the coating was carried out continuously for 10 minutes, the carbon fiber sheet was observed straight from the side, found to have neither laxation nor looseness, and recognized as being linearly conveyed. Next, the coating state was checked by visual observation, and the spinning state was found to be stable. Furthermore, the coating state was observed using a high speed video camera, and the observed state showed that the continuous fibers in the latter half of the spin-line were snaking, and that the fibrous resins were blown by an air flow above the carbon fiber sheet. After the coating, the prepreg conveyance system in the vicinity of the coating device was checked for contamination by visual observation, and almost no contamination was found.

In addition, the prepreg was checked by visual observation, and was found to have no arrangement disturbance in the carbon fibers. In addition, the basis weight uniformity of the applied resin in the width direction was evaluated, and the coefficient of variation, or CV value, was 13.6%.

Comparative Example 1

Coating with a matrix resin was carried out in the same manner as in Example 1, and the results were evaluated in the same manner as in Example 1, except that, differently from Example 1, no table was used in the vicinity of the coating device, that the coating with a matrix resin and the opening of the carbon fiber bundle by airblowing were carried out simultaneously, that the conveyance speed was set to 10 m/minute, and that the coating conditions described in Table 1 were used.

The carbon fiber sheet was observed straight from the side, and the carbon fiber sheet was found to be curved downward because of the opening by airblowing. After the coating, the prepreg conveyance system in the vicinity of the coating device was checked for contamination by visual observation, and the state showed that the matrix resin was found to have been blown off here and there and that the system contamination was outstanding.

In addition, the prepreg was checked by visual observation, and was found to have some arrangement disturbance in the carbon fibers in some parts of the prepreg. Furthermore, an attempt was made to evaluate the basis weight uniformity of the applied resin in the width direction, and even visual observation revealed the state in which the basis weight unevenness occurred in many points, resulting in judging that the state is unmeasurable.

Example 5 to Example 7

Coating with a matrix resin (the resin F) was carried out in the same manner as in Example 1, and the results were evaluated in the same manner as in Example 1, except that the coating conditions were changed as in Table 1. In this regard, the coating head temperature was set to 70° C. in Example 7.

When the coating was carried out continuously for 10 minutes in both Examples, the carbon fiber sheet was observed straight from the side, found to have neither laxation nor looseness, and recognized as being linearly conveyed. Next, the coating state was checked by visual observation, and the spinning state was found to be stable. Furthermore, the coating state was observed using a high speed video camera, and in both Examples, the fibrous resin was found to have been formed into continuous fibers. The resin was enabled to be regarded as having reached substantially linearly from the nozzle to the carbon fiber sheet. After the coating, the prepreg conveyance system in the vicinity of the coating device was checked for contamination by visual observation, and almost no contamination was found.

In addition, the prepreg was checked by visual observation, and was found to have no arrangement disturbance in the carbon fibers. In addition, the basis weight uniformity of the applied resin in the width direction was evaluated, and the coefficient of variation, or CV value, was good as shown in the Table.

Example 8 and Example 9

Coating with a matrix resin was carried out in the same manner as in Example 1, and the results were evaluated in the same manner as in Example 1, except that the temperature of the coating head was set to 97° C. and that the coating conditions were changed as in Table 2. In this regard, air was supplied at a pressure of 0.3 MPa to form an air flow in Example 9.

When the coating was carried out continuously for 10 minutes in both Examples, the carbon fiber sheet was observed straight from the side, found to have neither laxation nor looseness, and recognized as being linearly conveyed. Next, checking the coating state by visual observation showed some fluctuation in the coating state in Example 9, and the coating stability was lower, compared with Example 1, though not problematic. After the coating, the prepreg conveyance system in the vicinity of the coating device was checked for contamination by visual observation, and in Example 9, the state showed that the matrix resin was found to have been scattered, and the contamination was more. In this regard, scattered substances in Example 9 were checked and found to be ones in the forms of short fibers and droplets.

In addition, the prepreg was checked by visual observation, and was found to have no arrangement disturbance in the carbon fibers in either of the Examples. Furthermore, the basis weight uniformity of the applied resin in the width direction was evaluated, and in Example 9, the coefficient of variation, or CV value, was 15% or more, which is large, showing lower basis weight uniformity.

TABLE 1

|  |  | Example 1 | Example 2 | Example 3 | Example 4 | Comparative Example 1 |
|---|---|---|---|---|---|---|
| Coating Conditions | Conveyance Mode | Linear | | | | Curved |
| | Coating Height (mm) | 50 | 70 | 100 | 140 | 140 |
| | Area per Hole (mm$^2$) | | | 0.16 | | 0.16 |
| | Through-put-rate per Hole (g/minute) | | | 1.0 | | 0.1 |
| | Resin Viscosity (Pa · s) | | | 10 | | 10 |
| Evaluation Item | CF Arrangement Disturbance | | | ○ | | x |
| | Basis weight in Width Direction, CV Value (%) | 4.7 | 4.9 | 7.9 | 13.6 | — (Unmeasurable) |
| | Process Contamination | ○ | ○ | ○ | ○ | x |

TABLE 2

|  |  | Example 5 | Example 6 | Example 7 | Example 8 | Example 9 |
|---|---|---|---|---|---|---|
| Coating Conditions | Conveyance Mode | | | Linear | | |
| | Coating Height (mm) | 100 | 70 | 30 | 25 | 110 |
| | Area per Hole (mm$^2$) | 0.32 | 0.04 | 0.32 | 0.04 | 0.04 |
| | Through-put-rate per Hole (g/minute) | 2.0 | 1.0 | 1.0 | 2.0 | 2.0 |
| | Resin Viscosity (Pa · s) | 10 | 10 | 30 | 5 | 5 |
| Evaluation Item | CF Arrangement Disturbance | | | ○ | | |
| | Basis weight in Width Direction, CV Value (%) | 7.0 | 6.5 | 7.5 | 7.5 | 15 or more |
| | Process Contamination | ○ | ○ | ○ | Δ | x |

Example 10 and Example 18

A prepreg was prepared under the same conditions as in Examples 1 to 9 except that the impregnation was carried out using the impregnation device 16 (in this regard, Example 1 corresponds to Example 10, and Example 2 corresponds to Example 11. The other Examples correspond in the same manner.). Furthermore, this prepreg was allowed to undergo lamination and bagging so as to be quasi-isotropic, and then, cured in an autoclave at a temperature of 180° C. at a pressure of 6 atm for two hours to obtain a carbon fiber reinforced material. In any of the Examples, the material that is of good grade and has a good mechanical property was obtained.

Example 19

A prepreg was produced in the same manner as in Example 1 except that 56 yarns of carbon fiber (T800S-24K, manufactured by Toray Industries, Inc.) were used, that a resin G composed of an epoxy resin (a mixture of an aromatic amine epoxy resin and a bisphenol epoxy resin) containing a hardener (diaminodiphenyl sulfone) and polyethersulfone was used as a matrix resin, and that the coating conditions were as follows. The temperature of the coating head is 90° C., the area per a hole of the nozzle is 0.20 mm$^2$, the through-put-rate per a hole is 3.0 g/minute, and the number of nozzle holes in the width direction is 220. In addition, air was supplied at 0.10 MPa as an air flow, and the coating height H from the carbon fiber sheet to the lower face (nozzle face) of the coating head was 40 mm. In addition, the viscosity of the matrix resin (the resin G) in this case was 15 Pa·s.

When the coating was carried out continuously for 10 minutes, the carbon fiber sheet was observed straight from the side, found to have neither laxation nor looseness, and recognized as being linearly conveyed. Next, the coating state of the resin was checked by visual observation, and the spinning state was found to be stable. Furthermore, the coating state was observed using a high speed video camera, and the resin was found to have been formed into continuous fibers as in FIG. 2. Furthermore, the fibrous resins were hardly flowing in the horizontal direction, the resin reached linearly from the nozzle to the carbon fiber sheet, and the interval unevenness between the fibrous resins was found to be small. After the coating, the prepreg conveyance system in the vicinity of the coating device was checked for contamination by visual observation, and almost no contamination was found.

Next, a 3 m piece was cut from the produced prepreg in the longitudinal direction, the appearance and grade of a 1 m$^2$ area of the piece were checked by visual observation, and no arrangement disturbance of the carbon fibers was found in the prepreg.

In addition, the basis weight uniformity of the applied resin in the width direction was evaluated, and the coefficient of variation, or CV, was 4.5%, showing excellent basis weight uniformity. In this case, a polyester film was coated with a matrix resin, which was removed using a solvent, and the mass of the resin was determined.

Examples 20 to 22

Coating with a matrix resin was carried out in the same manner as in Example 19, and the results were evaluated in the same manner as in Example 19, except that the coating head height was changed as in Table 3 and that air was supplied at 0.17 MPa as an air flow.

When the coating was carried out continuously for 10 minutes, the carbon fiber sheet was observed straight from the side, found to have neither laxation nor looseness, and recognized as being linearly conveyed. Next, the coating state was checked by visual observation, and the spinning state was found to be stable. Furthermore, the coating state was observed using a high speed video camera, and in Example 20, the resin fiber was found to have been formed into continuous fibers as in FIG. 2. Furthermore, the fibrous resins were hardly flowing in the horizontal direction, the resin reached linearly from the nozzle to the carbon fiber sheet, and the interval unevenness between the fibrous resins was found to be small. In Example 21, the continuous fibers were slightly snaking immediately above the carbon fiber sheet, but were enabled to be regarded as having reached the carbon fiber sheet substantially in planar form. In Example 22, the observed state showed that the continuous fibers in the latter half of the spin-line were snaking, and that the fibrous resins were blown by an air flow above the carbon fiber sheet.

After the coating, the prepreg conveyance system in the vicinity of the coating device was checked for contamination by visual observation, and almost no contamination was found. In addition, the prepreg was checked by visual observation, and was found to have no arrangement disturbance in the carbon fibers. In addition, the coefficient of variation, or CV value, showing basis weight uniformity was good at a coating head height of 100 mm or less, as shown in Table 3.

TABLE 3

|  |  | Example 19 | Example 20 | Example 21 | Example 22 |
|---|---|---|---|---|---|
| Coating Conditions | Conveyance Mode | | Linear | | |
| | Coating Height (mm) | 40 | 65 | 100 | 165 |
| | Area per Hole (mm$^2$) | | 0.20 | | |
| | Through-put-rate per Hole (g/minute) | | 3.0 | | |
| | Resin Viscosity (Pa · s) | | 15 | | |

TABLE 3-continued

|  |  | Example 19 | Example 20 | Example 21 | Example 22 |
|---|---|---|---|---|---|
| Evaluation Item | CF Arrangement Disturbance | | ○ | | |
| | Basis weight in Width Direction, CV Value (%) | 4.5 | 4.6 | 7.3 | 14.0 |
| | Process Contamination | ○ | ○ | ○ | ○ |

Example 23 to Example 26

A prepreg was prepared under the same conditions as in Example 19 to 22 except that the impregnation was carried out using the impregnation device 16 (in this regard, Example 19 corresponds to Example 23, and Example 20 corresponds to Example 24. The other Examples correspond in the same manner.). Furthermore, this prepreg was allowed to undergo lamination and bagging so as to be quasi-isotropic, and then, cured in an autoclave at a temperature of 180° C. at a pressure of 6 atm for two hours to obtain a carbon fiber reinforced material. In any of the Examples, the material that is of good grade and has a good mechanical property was obtained.

The present application is based on Japanese Patent Application No. 2017-055614 filed on 22 Mar. 2017, the content of which is incorporated herein by reference.

REFERENCE SIGNS LIST

1 Reinforcing Fiber
1a Reinforcing Fiber Sheet
1b Reinforcing Fiber Sheet Provided with Resin (Prepreg)
1c Reinforcing Fiber Sheet Impregnated with Resin (Prepreg)
1d Reinforcing Fiber Sheet Both Faces of which are Provided with Resin (Prepreg)
1e Reinforcing Fiber Sheet Provided with Resin (Prepreg)
1f Reinforcing Fiber Sheet Provided with Resin (Prepreg)
2, 2a, 2b, 2c Resin
3, 3a, 3b, 3c Release Sheet
11 Creel
12 Arrangement Device
13a, 13b, 13c, 13d, 13e Conveyance Roll
14a, 14b, 14c, 14d Release Sheet Supply Device
15a, 15b, 15c Table
16, 16a, 16b, Impregnation Device
17, 17a, 17b Release Sheet Wind-up Device
18 Wind-up Device (Winder)
19, 19a, 19b, 19c Air Flow
20, 20a, 20b, 20c Coating Head
21 Resin formed in Fibrous Form
22, 22a, 22b Cooling Device
H Coating Height
X Running Direction (Horizontal Direction) of Reinforcing Fiber Sheet 1a
B Direction Perpendicular to Running Direction (Horizontal Direction) of Reinforcing Fiber Sheet 1a
C Width Direction (Horizontal Direction) of Reinforcing Fiber Sheet 1a

The invention claimed is:

1. A method of producing a prepreg, comprising: discharging a molten resin from a discharge portion; introducing the discharged resin by an air flow; and capturing said discharged resin on a reinforcing fiber sheet conveyed continuously, wherein said discharged resin is captured in a region in which said reinforcing fiber sheet is conveyed substantially in planar form and is supported so as not to curve in the longitudinal direction at the resin capture region.

2. The method of producing a prepreg according to claim 1, wherein said discharged resin is formed into a fibrous form and then captured on said reinforcing fiber sheet.

3. The method of producing a prepreg according to claim 1, wherein a coating height H from said reinforcing fiber sheet to said discharge portion is 1 to 100 mm.

4. The method of producing a prepreg according to claim 1, wherein said discharged resin is captured on both faces of said reinforcing fiber sheet, using at least two heads for discharging the resin.

5. The method of producing a prepreg according to claim 1, wherein two or more resins, differing in composition and/or viscosity, are discharged.

6. The method of producing a prepreg according to claim 4, wherein said resin captured on one face of said reinforcing fiber sheet is a different resin, in terms of composition and/or viscosity, from said resin captured on the other face.

7. The method of producing a prepreg according to claim 1, wherein said discharged resin is captured and then used for impregnation.

8. A method of producing a fiber reinforced composite material, comprising: obtaining a prepreg by the method of producing a prepreg according to claim 1; and then curing said prepreg.

* * * * *